(12) United States Patent
Dunki et al.

(10) Patent No.: US 7,409,388 B2
(45) Date of Patent: Aug. 5, 2008

(54) GENERATION OF ANONYMIZED DATA RECORDS FOR TESTING AND DEVELOPING APPLICATIONS

(75) Inventors: Peter Dunki, Zurich (CH); Christoph Frei, Baden (CH)

(73) Assignee: UBS AG, Zurich (CH)

( * ) Notice: Subject to any disclaimer, the term of this patent is extended or adjusted under 35 U.S.C. 154(b) by 368 days.

(21) Appl. No.: 11/198,145

(22) Filed: Aug. 8, 2005

(65) Prior Publication Data

US 2006/0059148 A1 Mar. 16, 2006

(30) Foreign Application Priority Data

Sep. 15, 2004 (EP) .................................. 04021928

(51) Int. Cl.
*G06F 17/30* (2006.01)
(52) U.S. Cl. .............................. 707/6; 707/9; 707/104.1
(58) Field of Classification Search .................... 707/6, 707/9, 104.1, 102
See application file for complete search history.

(56) References Cited

U.S. PATENT DOCUMENTS

| | | | | |
|---|---|---|---|---|
| 5,878,426 | A * | 3/1999 | Plasek et al. | 707/102 |
| 6,546,395 | B1 * | 4/2003 | DeKimpe et al. | 707/101 |
| 6,701,514 | B1 * | 3/2004 | Haswell et al. | 717/115 |
| 6,951,013 | B1 * | 9/2005 | Lozins | 717/125 |
| 7,171,412 | B2 * | 1/2007 | Iline et al. | 707/9 |
| 7,174,348 | B1 * | 2/2007 | Sadhu et al. | 707/104.1 |
| 7,194,465 | B1 * | 3/2007 | MacGregor | 707/6 |
| 2005/0283667 | A1 * | 12/2005 | Batten et al. | 714/25 |
| 2006/0059189 | A1 * | 3/2006 | Dunki et al. | 707/102 |

OTHER PUBLICATIONS

Steven P. Reiss: "Practical data-swapping: the first steps" ACM Transactions on Database Systems, Bd. 9, Nr. 1, 1. Marz 1984 (Mar. 1, 1984), Seiten 20-37, XP 002313203 *Zusammenfassung*.

Strategies to Improve Application Testing 'Online! Jan. 2004, Princeton Softech, Princeton, NJ, XP002313205 Gefunden im Internet: URL:http://www.princetonsoftech.com/library/rt/TestStrategiesWP-a4.pdf.

(Continued)

*Primary Examiner*—Christian P. Chace
*Assistant Examiner*—Jacques Veillard
(74) *Attorney, Agent, or Firm*—Michael Bednarek; Paul, Hastings, Janofsky & Walker LLP

(57) ABSTRACT

A mechanism is described for the computer-aided generation of anonymized data records (44) for developing and testing application programs that are intended for use in a productive network. A method according to the invention comprises the provision of at least one productive database containing data records (40) that contain productive data elements to be anonymized, the provision of at least one non-productive database containing data records (42) that, in regard to the character string length of the data elements contained therein, at least partly correspond to the productive data records, the determination of a first data record (40) from the productive database and of a second data record (42) from the non-productive database and also the generation of anonymized data records (44) by replacing the data elements to be anonymized in the first data record (40) by data elements of the second data record (44).

24 Claims, 4 Drawing Sheets

OTHER PUBLICATIONS

C. K. Liew, U. J. Choi, C. J. Liew: "A Data Distortion by Probability Distribution", ACM Transactionson Database Systems, Bd. Nr. 3, Sep. 3, 1985, Seiten 395-411, XP002313202.

R. Agrawal, J. Kiernan, R. Srikant, Y. Xu: "Hippocratic Databases" Proceedings of the 28th VLDB Conference, Hong Kong, China, 'Online! 2002, Seiten 143-154, XP002313204, Gefunden im Internet: URL:http://citesser.ist.psu.edu/agrawal02hippocratic.htm gefunden am Jan. 10, 2005! Copy of European Search Report Dated Feb. 1, 2005.

Papotto, L., article entitled Test Data Management Part 1-Application Readiness, pp. 1-4, published by Princeton Softech, Inc., 2004.

Papotto, L. article entitled "Test Data Management Part 2—Data Privacy and Techniques for De-Identifying Test Data", pp. 1-4, published by Princeton Softech, Inc., 2004.

Papotto, L., article entitled "Test Data Management Part 3—Automated Testing", pp. 1-2, published by Princeton Softech, Inc., May 2004.

European Office Action Dated Feb. 22, 2007.

* cited by examiner

GENERATION OF ANONYMIZED DATA RECORDS FOR TESTING AND DEVELOPING APPLICATIONS

FIELD OF THE INVENTION

The invention relates to the field of data anonymization. Stated more precisely, the invention relates to the generation of anonymized data records for the development and testing of computer applications (hereinafter referred to as applications).

BACKGROUND OF THE INVENTION

The development and testing of new applications requires the presence of data that can be processed by the new applications in trial runs. In order to be able to attribute a reliable information content to the results of the trial runs, it is essential that the data processed in the trial runs are equivalent in a technical respect (for example, as concerns the data format) to those data that are to be processed by the new applications subsequent to the development and test phase. For this reason, within the framework of the trial runs, those application data are frequently used that were generated by the currently productive (predecessor) versions of the applications to be developed or to be tested. These data, hereinafter referred to as productive application data or simply as productive data, are normally stored in databases in the form of data records.

The use of productive application data for development and test purposes is in practice not without problems. Thus, it has emerged that the data spaces accessible by the developers on the basis of their respective authorization in the productive environment are frequently not large enough to obtain reliable results. The results of trial runs also vary from developer to developer on the basis of their individual-specific data space authorizations. The data space authorization of individual persons can indeed be temporarily expanded for the trial runs; this measure is, however, expensive and, in the case of sensitive or confidential data in particular, is not possible without further checks or restrictions.

Another approach in regard to the use of sensitive or confidential productive application data within the framework of trial runs is to perform the trial runs on a compartmentalized and access-protected central test system. However, the technical cost associated with setting up such a central test system is high. In addition, such a procedure does not permit any delivery of data to (decentralized) development and test systems for error analysis.

The above-explained and further disadvantages have led to the insight that the use of productive data for development and test purposes is ruled out in many cases. An alternative to the use of productive data was therefore sought. On the one hand, said alternative should present a realistic copy of the productive data in regard to the data format, the data content, etc. On the other hand, the additional technical precautions, in particular as concerns the protection against unauthorized access (authorization mechanisms, fire walls, etc.) should be capable of being kept to a minimum as far as possible.

It has emerged that the above-cited requirements are fulfilled by test data that are generated by a partial anonymization (or masking) of productive data records. By anonymizing sensitive elements of the productive data, the potential damage that could be anticipated in the event of unauthorized accesses is reduced. This makes it possible to relax the safety mechanisms. In particular, the test data for trial runs and for error analysis can be loaded onto decentralized systems. Since on the other hand, however, the technical aspects (data format, etc.) of the productive application data do not have to be altered or have to be altered only slightly by a suitable anonymization mechanism, the anonymized test data form a realistic copy of the productive data.

A data record can be anonymized by erasing the data elements to be anonymized or by overwriting such data elements by a predefined standard text identical for all the data records, while the data elements not to be anonymized are retained unaltered. Such a procedure leads to anonymized data records without (substantial) changes arising in the data format. It has, however, became apparent that trial runs using such anonymized data records do not reveal all the weak points in the application to be developed or to be tested and frequently errors occur during initial use of the application in the productive environment.

The object underlying the invention is to disclose an efficient approach to providing anonymized test data. In this connection, the test data are intended, in particular, to be as faithful a copy as possible of the productive data in order to optimize the information content of the trial runs. At the same time, the probability of failure of the application to be newly developed in the productive environment is intended to be minimized and the maintenance expenditure associated therewith is intended to be reduced.

SUMMARY OF THE INVENTION

In accordance with a first aspect of the invention, this object is achieved by a test data anonymization method that generates anonymized data records for developing and testing application programs that are intended for use in a productive environment (for example, a productive computer network). The method comprises the steps of providing at least one productive database containing data records that contain productive data elements to be anonymized, providing at least one non-productive database containing data records that at least essentially correspond in regard to the character string lengths (at least of a subset) of the data elements contained therein with productive data records, determining a first data record from the productive database, determining a second data record from the non-productive database, and generating an anonymized data record by replacing the data elements to be anonymized in the first data record by data elements of the second data record.

The anonymized data elements of the anonymized data records therefore correspond (at least partly) in regard to their character string lengths to productive data elements. This measure has the effect that the anonymized data records are a more accurate copy of the productive data records. In particular, character-string-length-critical handling steps (such as sorting algorithms) or character-length-critical output operations (such as the generation of printed matter) can therefore be checked more reliably by means of the data records anonymized in accordance with the invention. This approach is supported by providing a plurality of data elements replacing data elements to be anonymized.

This procedure permits an individualization corresponding or approximated to the productive data records in the anonymized data records, and this likewise results in many cases in more reliable trial runs since, for example, statistical properties of the productive data elements can be simulated.

The data elements can be replaced in such a way that the data elements to be anonymized in the first data record (at least with a statistically high probability) have character string lengths other than the data elements that replace them from the nonproductive database. Furthermore, provision may be made that the nonproductive database does not contain a data record that, in regard to a combination of the character string lengths of a data element set contained therein, occurs only once in the nonproductive database. Each of these two measures and, in particular, their combination increases the degree of anonymization of the anonymized data records.

It was found, specifically, that individual productive data records can frequently be unambiguously identified on the basis of character string lengths of data elements contained therein and, in particular, on the basis of combinations of such characteristic string lengths. It is therefore expedient if, at least at the level of an individual data record, the data elements that are to replace data elements to be anonymized have individual character string lengths (or character string length combinations) other than the replaced data elements to be anonymized. It is also expedient in this regard (especially if the non-productive data records have been obtained by copying productive data records or data elements) if no data record in the non-productive database is unique in regard to a combination of character string lengths of the data elements contained therein.

As already explained above, the non-productive data records essentially correspond to productive data records in regard to the character string lengths of all the data elements contained therein or a subset thereof. In accordance with a first variant, this correspondence relates to the number of the characters contained in the individual character strings. In accordance with a second variant, which can be combined with the first variant, the correspondence in regard to the character string lengths relates to the individual geometrical dimensions of the data elements when they are reproduced (for example on a viewing screen, a printout, etc.). Thus, the data element images (i.e. the graphical representations) of the non-productive data records may correspond at least partially to the data element images of productive data records. In this connection, however, it is not necessary for the correspondences, required above, to exist between the first data set used to generate a single anonymized data record from the productive database and the second data record from the non-productive database. On the contrary, it is sufficient and, in many cases, even expedient, if the required correspondences apply in total between the set of the nonproductive data records and the set of the productive data records.

The approach of combining data elements from the productive database with data elements from the nonproductive database for the purpose of generating an anonymized data record makes it possible for the nonproductive database to contain copies of data records and/or data elements of the productive database. This procedure simplifies the creation of the non-productive database (for example, by complete or selective historicization of the productive database). Especially in combination with an assignment scheme ensuring adequate anonymization between productive and non-productive data records, a sufficiently high anonymization remains ensured for many purposes. In particular, this measure promotes the requirement that the non-productive data records should correspond to the productive data records in regard to the character string lengths of the data elements contained therein.

The nonproductive database may contain exclusively or at least partly data records containing data elements different from the productive data elements. In practice, it was found that an adequate anonymization is in any case still ensured if the proportion of data records containing data elements different from the productive data elements is at least 5% in the non-productive database. Preferably, this proportion is 10% or more.

The data elements different from the productive data elements in the non-productive database may be drawn from a publicly accessible electronic database or file. Depending on type, format and comprehensible content (meaning) of the data elements to be anonymized (and as a function of the application to be developed or to be tested), different, publicly accessible electronic databases or files are suitable for this purpose. For example, electronic lists and telephone books (or other electronic name and/or address lists) have proved suitable.

Data records can be determined (or derived) from the productive and from the non-productive database in various ways. In the simplest case, determination takes place by a sequential reading-out and assignment of the data records from the two databases. However, it is also possible that the derivation of associated data records is based on an assignment between data elements or data records from the non-productive database and data elements or data records to be anonymized from the productive database.

The assignment may be random-based or, alternatively, it may be based on a deterministic assignment method. The deterministic assignment may proceed using an assignment table and/or a cryptographic mechanism.

The deterministic assignment may take place in such a way that a subsequent determination is possible of that data element or data record from the productive database that is assigned to an anonymized data element or data record. This measure facilitates, for example, the error analysis in trial runs. The deterministic assignment can ensure that the same data element or the same data record from the non-productive database is always assigned to a data element or data record from the productive database. This measure is advantageous, in particular, if a mechanism is provided for updating the anonymized data records.

To improve the information content of trial runs, the statistical properties of the data elements or of data element segments (for example at the beginning of the data elements) of the non-productive database may correspond to or may be approximated to the statistical properties of the data elements or of data segments in the productive database. Thus, it is conceivable that the statistical distributions at least of the respective first alphanumerical character of certain data elements in the productive database and in the non-productive database (at least approximately) correspond. In practice, it has been found that many mechanisms of applications to be developed or to be tested (for example, sorting algorithms) are character selective. For these and also for further reasons, more reliable information can be obtained in trial runs if the productive database and the non-productive database satisfy comparable statistics at least in regard to test-relevant aspects.

Identifiers can be assigned in each case to the individual data elements of data records of the productive database and of data records of the nonproductive database. The provision of identifiers makes it possible to replace productive data elements to be anonymized by data elements having corresponding identifiers.

The data elements contained in the non-productive database may have at least partly a meaning that can be comprehended by a user. Thus, said data elements may be (at least, partly) texts, designations, names, address details, etc. In accordance with one embodiment of the present invention, the data elements contained in the productive and/or those contained in the nonproductive database contain name data and/or address data.

The anonymization approach according to the invention yields anonymized data records that are suitable for developing and testing application programs may be programs that output the data elements contained in the anonymized data records on a display device (for example, on a computer viewing screen) and/or in the form of printed matter (for example, as an addressed letter). The data records anonymized according to the invention are suitable, however, also for trial runs of applications that contain character-string-length-selective algorithms and/or character-type-selective algorithms such as sorting algorithms or cryptographic algorithms.

The invention may be implemented as software or as hardware or as a combination of these two aspects. Thus, in accordance with a further aspect according to the invention, a computer program product containing program code means for performing the method according to the invention is provided when the computer program product is executed on one or more computers. The computer program product may be stored on a computer-readable data medium.

In accordance with a hardware aspect of the invention, a computer system is provided for generating anonymized data records for developing and testing application programs that are intended for use in a productive environment. The computer system comprises at least one productive database containing data records that contain productive data elements to be anonymized, at least one non-productive database containing data records that at least essentially correspond to productive data records in regard to character string lengths of the data elements contained therein, and a programmed computer having access to the productive database and to the non-productive database, for deriving a first data record from the productive database and a second data record from the non-productive database and for generating an anonymized data record by replacing the data elements to be anonymized in the first data record by data elements of the second database. The computer system may furthermore comprise a test database in which the anonymized data records are stored.

SUMMARY OF THE DRAWINGS

Further advantages and configurations of the invention are explained in greater detail below with reference to preferred embodiments and to the accompanying drawings. In the drawings.

DESCRIPTION OF PREFERRED EMBODIMENTS

The invention is explained in greater detail below by reference to preferred embodiments. Although one of the embodiments explained is focused on the generation of anonymized data records containing realistic address images, it is pointed out that the invention is not restricted to this field of application. The invention may, for example, be used anywhere where applications involving character-string-length-selective processing steps are to be tested.

Figure 1:
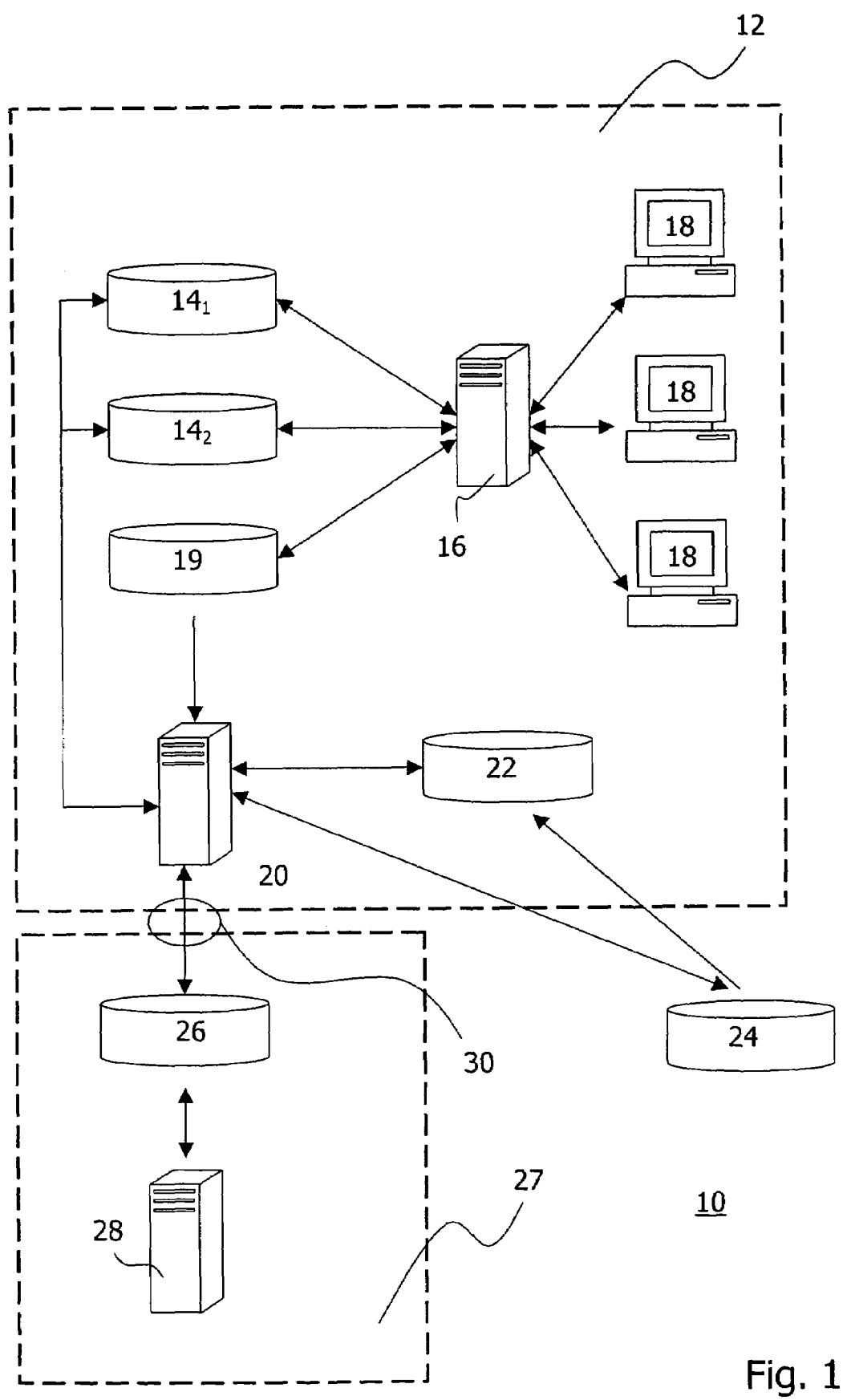
FIG. 1 shows a computer system according to the invention for generating anonymized data records.

FIG. 1 shows an embodiment of a computer system 10 according to the invention for generating anonymized data records for developing and testing application programs. In the various embodiments, corresponding elements and components are provided in each case with corresponding reference symbols.

In accordance with the embodiment shown in FIG. 1, the computer system 10 comprises a productive computer network 12 involving a multiplicity of productive databases 14, at least one application server 16 and also a multiplicity of computer terminals 18. Running on the application server 16 is a plurality of application programs whose services the application server 16 makes available to the computer terminals 18 in the productive network 12. As database server, the application server 16 makes possible, in addition, access to the (productive) data records contained in the productive databases 14. The logically related data elements (or data) of such a data record may be distributed over a plurality of productive databases 14. Thus, static data elements of the productive data records may be stored and maintained in a first productive database $14_1$ and non-static data elements of the productive data records may be stored and maintained in a second productive database $14_2$. The productive network 12 and, in particular, the productive databases 14 are protected by a series of security mechanisms against unauthorized accesses. The security mechanisms comprise authentication concepts and user-dependent data space authorizations.

In the productive network 12, use is made of the application programs running on the application server 16 in accordance with the functionalities they are intended to provide. This means that productive application data are constantly transferred between the application server 16 and the productive databases 14, on the one hand, and the application server 16 and the computer terminals 18, on the other. Said productive data have, accordingly, an intended purpose defined by the application programs running on the application server 16. Thus, the application programs may be machine controls, address-based applications (for example, for generating printed matter), components of an ERP (enterprise resource planning) system, a CAD (computer aided design) program, etc. The actual intended purpose of the application data does not affect the scope of the invention.

Furthermore, there is present in the productive network 12 an assignment component 19 that is indicated in the embodiment in accordance with FIG. 1 as a database and whose function is described more precisely below. Depending on the assignment mechanism provided, the assignment component 19 may also be designed as a file, as a cryptographic program routine, etc. Given a suitable authorization, the assignment component 19 can be accessed by some of the computer terminals 18 via the application server 16.

In the exemplary case shown in FIG. 1, the computer system 10 furthermore comprises an anonymization component 20 disposed inside the productive network 12 and having access to the assignment component 19 and also to three further databases, namely to a non-productive database 22 containing, for example, historicized productive data records (still disposed in the productive network 12 for reasons of access control), a publicly accessible electronic database 24 containing public data records and also at least one test database 26 containing anonymized data records. The anonymization computer 20 has reading access to the productive databases 14, the assignment component 19 and the publicly accessible electronic database 24, as well as write/read access to the historicization database 22 and the test database 26.

The functional difference between the productive databases 14 and the non-productive database 22 is essentially that the contents of the productive databases 14 can (continuously) be manipulated by the application server, whereas the non-productive database 22 is a "data preserve" which is not needed by the application programs running on the application server 16 if they are used in accordance with the functionalities they provide.

The publicly accessible electronic database 24 and the test database 26 are located outside the productive network 12 in FIG. 1. More strictly speaking, the test database 26 is disposed inside a development and test environment in the form of a computer network 27. An interface 30 permits a transfer of anonymized data records from the productive network 12 to the test database 26 and, consequently, to the network 27. In its structure, the network 27 resembles the productive network 12 and comprises an application server 28 for development and test purposes. The application server 28 has access to the test database 26. The test database 26 may be structured similarly to the productive databases 14. In order to enable an optimum testing of new or improved applications, the database 26 may have an identical structure to the productive databases 14. This may require splitting up the database 26 into individual, physically separate databases.

Figure 2:
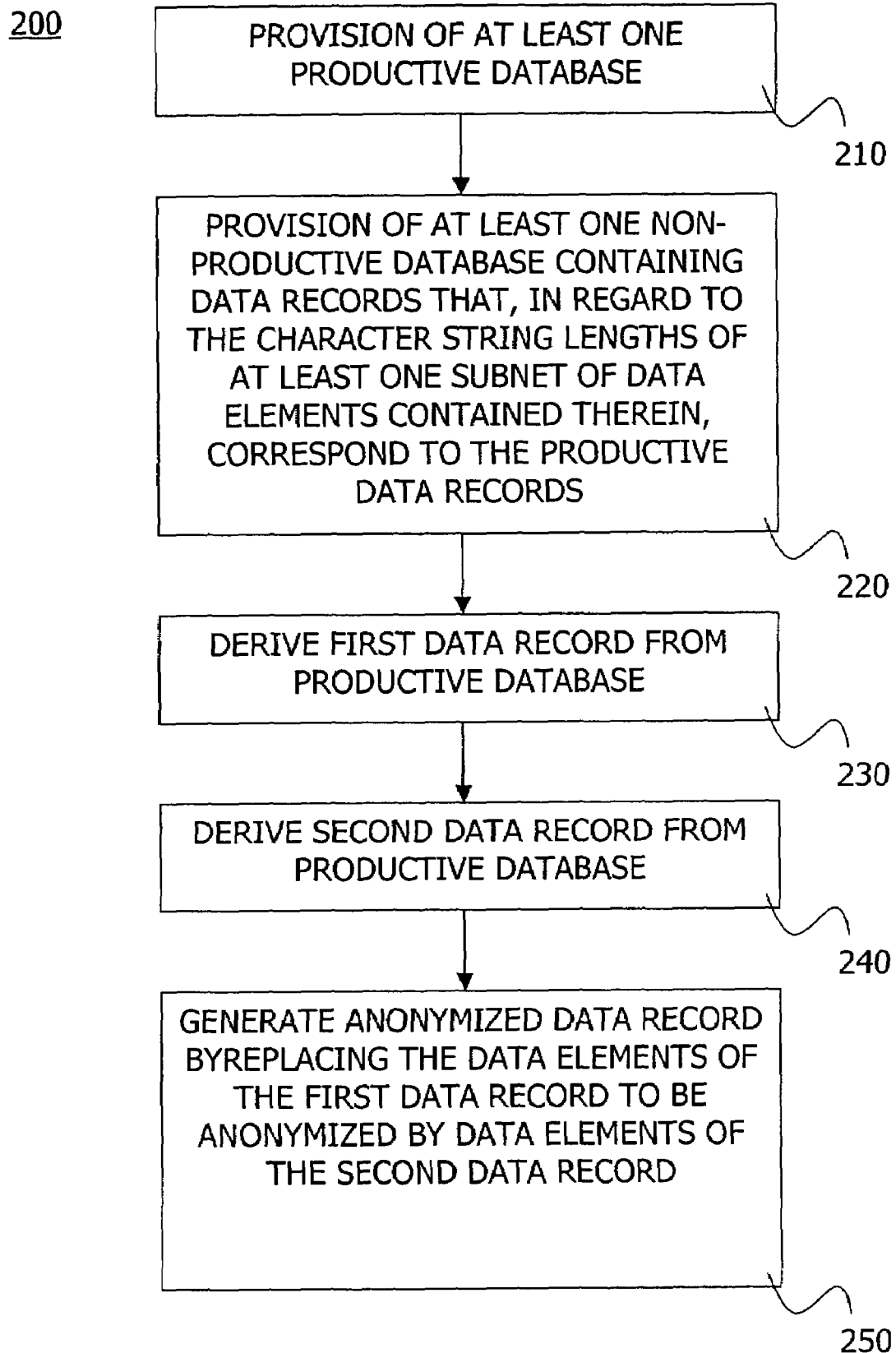
FIG. 2 shows a diagrammatic flowchart of a method according to the invention for generating anonymized data records.

The mode of operation of the computer system 10 shown in FIG. 1 during the generation of anonymized data records in accordance with the anonymization method according to the invention is now explained in greater detail with reference to the flowchart 200 shown in FIG. 2.

The method starts with the provision of the productive databases 14 and also of at least one non-productive database 22 in the steps 210 and 220. The databases 14, 22 contain productive and non-productive data records that each comprise individual data elements. Present in the non-productive database 22 are (at least, also) data records that correspond, in regard to the character string lengths of at least a subset of data elements contained therein, to the productive data records (that is to say, to a corresponding subset in each case of productive data elements contained therein).

In the two subsequent steps 230 and 240, a first data record is read out of the productive databases 14 and a second data record is read out of the non-productive database 22. The steps 230 and 240 could also be executed in the reverse order. The order in which the steps 230 and 240 are executed may be defined by an assignment scheme between data elements or data records from the non-productive database 22 and data elements or data records that are to be anonymized from the productive databases 14. Thus, a second data record from the non-productive database 22 may be randomly or deterministically allotted to a first data record read out of the productive databases 14.

In a concluding step 250, an anonymized data record is generated by replacing data elements to be anonymized in the first data record (from the productive databanks 14) by data elements of the second data record (from the non-productive database 22). The anonymized data record is stored in the test database 26.

Figure 3:
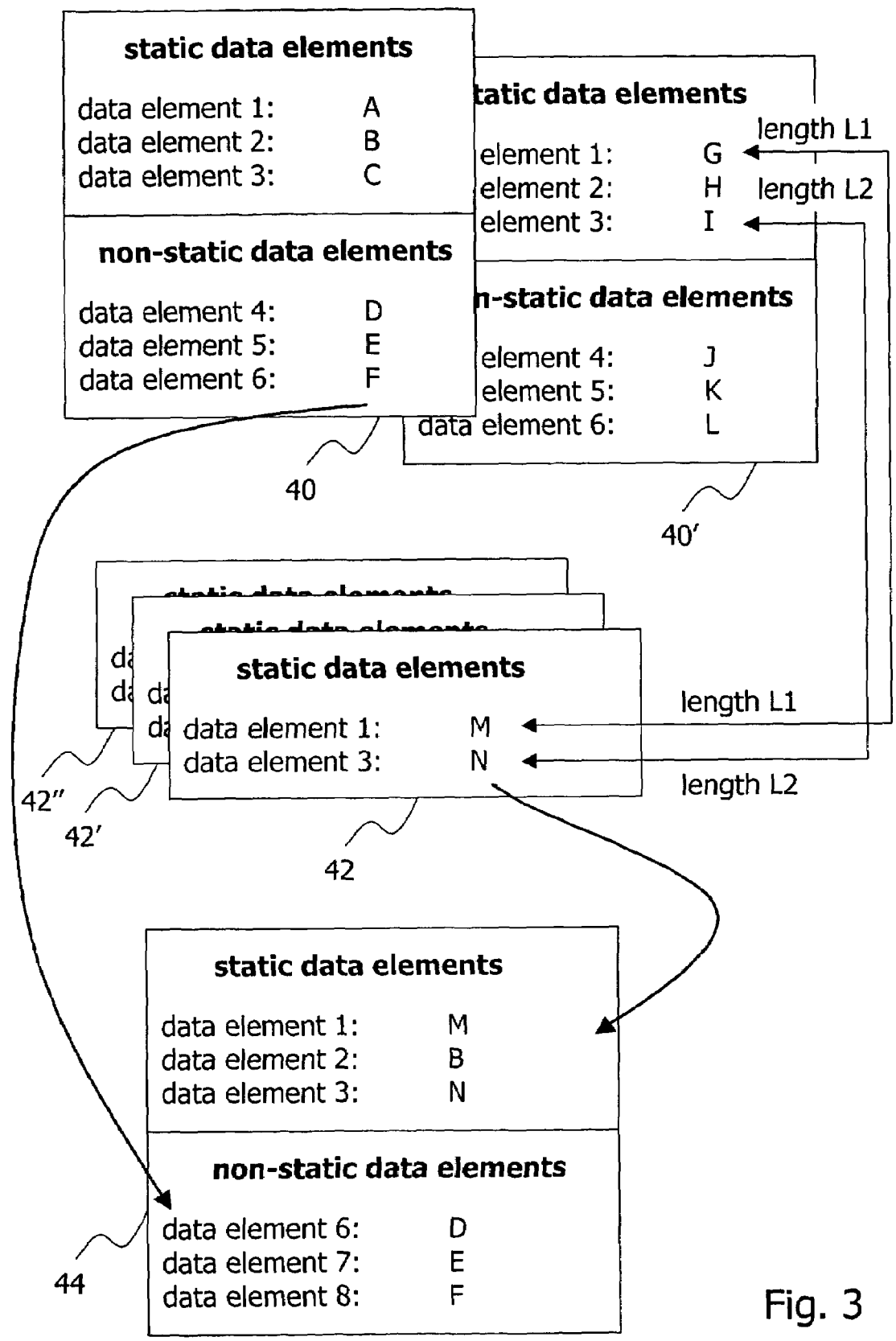
FIG. 3 shows a diagrammatic representation of the generation of anonymized data records in accordance with a first embodiment.

FIG. 3 shows a diagrammatic representation of an exemplary embodiment for the generation of anonymized data records using productive data records 40, 40' contained in the productive databases 14, on the one hand, and non-productive data records 42, 42', 42" contained in the non-productive database 22 (and/or the publicly accessible electronic database 24), on the other.

The data records contained in the non-productive database 22 can be generated in various ways. In accordance with a first variant, all the data records in the non-productive database 22 were obtained by copying public data records (or at least by copying data elements contained therein) from the database 24. In accordance with a second variant, all the non-productive data records were generated by copying or historicizing (withdrawal at a certain instant in time) of productive data records (or at least by copying or historicizing data elements contained therein). In accordance with a third variant, the non-productive database 22 comprises data records that originate, in regard to the data elements contained therein, from the productive databases 14 and the publicly accessible electronic database 24. Non-productive data records containing data elements from the publicly accessible electronic database 24 can consequently be added to non-productive data records containing data elements from the productive databases 14 in order to increase the degree of anonymization. In this way, an uncertainty factor is generated in such a way that, in the development and test environment on the basis of an anonymized data record, the existence of an associated productive data record (and corresponding productive data elements) can no longer be unambiguously inferred.

FIG. 3 shows by way of example two productive data records 40, 40' at the top. Each of said data records 40, 40' comprises a plurality of indexed productive data elements (A, B, C, . . . ) that can be manipulated (generated, altered, erased, etc.) and processed by the application programs running on the application server 16.

The data elements are subdivided in the exemplary case shown in FIG. 3 into static data elements (or master data) and non-static data elements (or transaction data). Non-static data elements are preferably very short-lived data elements that are normally necessary only for the execution of an individual transaction. Typical OLTP (On-Line Transaction Processing) systems are designed to process many thousands or even millions of individual small transactions per day. In any case, in uncondensed form, the non-static data elements are therefore available only for a short time (although, for reasons of being able to reconstruct individual transactions, they are, as a rule, saved in condensed form). Compared to non-static elements only current in transactions, the static data elements are markedly longer-lived in terms of time. For this reason, as a rule, many data records contain identical static data elements, but non-static data elements that differ in a transaction-specific way. Despite their long life, the static data elements may also be subject to manipulations, but, compared to the lifetime of typical transaction-specific, non-static data elements, these occur extremely rarely.

The static data elements are accordingly those data that, although they are needed by the application programs, are not manipulated, or at least not frequently, and are each used identically by a multiplicity of different processes. Static data elements may, for example, be an event date (for example, a specification of a day or a year), a name, an address specification, a setpoint, etc. On the other hand, the non-static data elements are regularly manipulated by the application programs running on the application server 16 and they therefore form, for example, the input parameters or output parameters of said application programs. In the exemplary embodiment in accordance with FIG. 3 it is assumed that only some of the static data elements of the productive data records can be anonymized, while the non-static data elements do not require anonymization and are intended to be available unaltered in the development and test environment.

An identifier in the form of a number between 1 and 6 is assigned to each of the individual data elements. Corresponding identifiers are used both for the productive data records 40, 40' and also for the non-productive data records 42, 42', 42". This procedure makes it possible to anonymize productive data elements by replacing non-productive data elements with a corresponding identifier.

The non-productive data records 42, 42', 42" comprise, in the example in accordance with FIG. 3, only those data elements that are needed to anonymize the productive data records. Since, in the exemplary embodiment in accordance with FIG. 3, only the productive data elements having the identifiers 1 and 3 have to be anonymized, the non-productive data records 42, 42', 42" each contain only data elements having the identifiers 1 and 3 to reduce the memory space requirement. In accordance with a modification of the exemplary embodiment in accordance with FIG. 3, it would, however, be possible for the non-productive data records 42, 42', 42" to have the same format as the above-explained productive data records 40, 40' (i.e. to comprise static and non-static data elements like the productive data records 40, 40'). In that case, only the data elements needed for anonymization purposes (here having the identifiers 1 and 3) would be read out of the non-productive data records and transferred to the respective anonymized data records to be generated.

As emerges from FIG. 3, the non-productive data record 42 corresponds, in regard to the character string lengths of the data elements 1 and 3 contained therein, to the productive data record 40'. In other words, both the data element G having the identifier 1 of the productive data record 40' and the data element M having the identifier 1 of the non-productive data record 42 both have the same character string length L1. Furthermore, both the data element I (identifier 3) of the productive data record 50' and the data element N (identifier 3) of the non-productive data set 42 each have the corresponding length L2. In the non-productive database 22, the data record 42 is, however, not unique in regard to the presence of a data element of the identifier 1 having a length L1 and of the data element 3 having a length L2. On the contrary, in the non-productive database 22 at least one further data record (for example data record 42' and/or data record 42") is present that likewise comprises a data element of the identifier 1 having the length L1 and a data element of the identifier 3 having the length L2.

The generation of an anonymized data record 44 shown in FIG. 3 on the basis of the productive data records 40, 40' and of the non-productive data records 42, 42' and 42" now proceeds as follows. In a first step, there is derived from the productive databases 14 (for example, on the basis of a user-definable selection mechanism) a productive data record that is to be anonymized and transferred to the test database 26 as an anonymized data record. This is shown in FIG. 3 by way of example for the productive data record 40. Here, it is again assumed that the data elements having the identifiers 1 and 3 of the productive data records are to be anonymized. With respect to data record 40 in accordance with FIG. 3, the data records to be anonymized are therefore the data elements A and C. These two data elements A and C are to be replaced by data elements having corresponding identifiers of the non-productive data records 42, 42' and 42".

A data record from the non-productive database 22 whose data elements having the identifiers 1 and 3 replace the data elements having the corresponding identifiers of the data record 40 extracted from the productive databases 14 is now to be assigned in a next step to the productive data record 40. In the exemplary embodiment shown in FIG. 3, the non-productive data record 42 is assigned to the productive data record 40. This assignment may take place deterministically (using an assignment table or a cryptographic mechanism) or on a random basis.

To generate the anonymized data record 44, the data elements having the identifiers 1 and 3 of the productive data record 40 are replaced by the corresponding data elements of the non-productive data record 42. More strictly speaking, the data element A is replaced by the data element M and the data element C by the data element N in order to anonymize the productive data record 40. The data elements B, D, E and F of the productive data record 40 do not, on the other hand, require any anonymization and are transferred unaltered to the anonymized data record 44.

In FIG. 3, the fact that the anonymized data record 44 has the same format as the productive data record 40 can be clearly perceived. Furthermore, it is evident that, for example, the data element M of the non-productive data record 42 (according to the assignment mechanism, at least with high probability) will have a different character string length from the data element A of the productive data record 40, which is replaced by the data element M. The requirement for corresponding character length strings relates, specifically, not to the individual productive and non-productive data records that are each combined to generate the anonymized data record. On the contrary, this requirement generally relates to the total content of the non-productive database 22.

Figure 4:
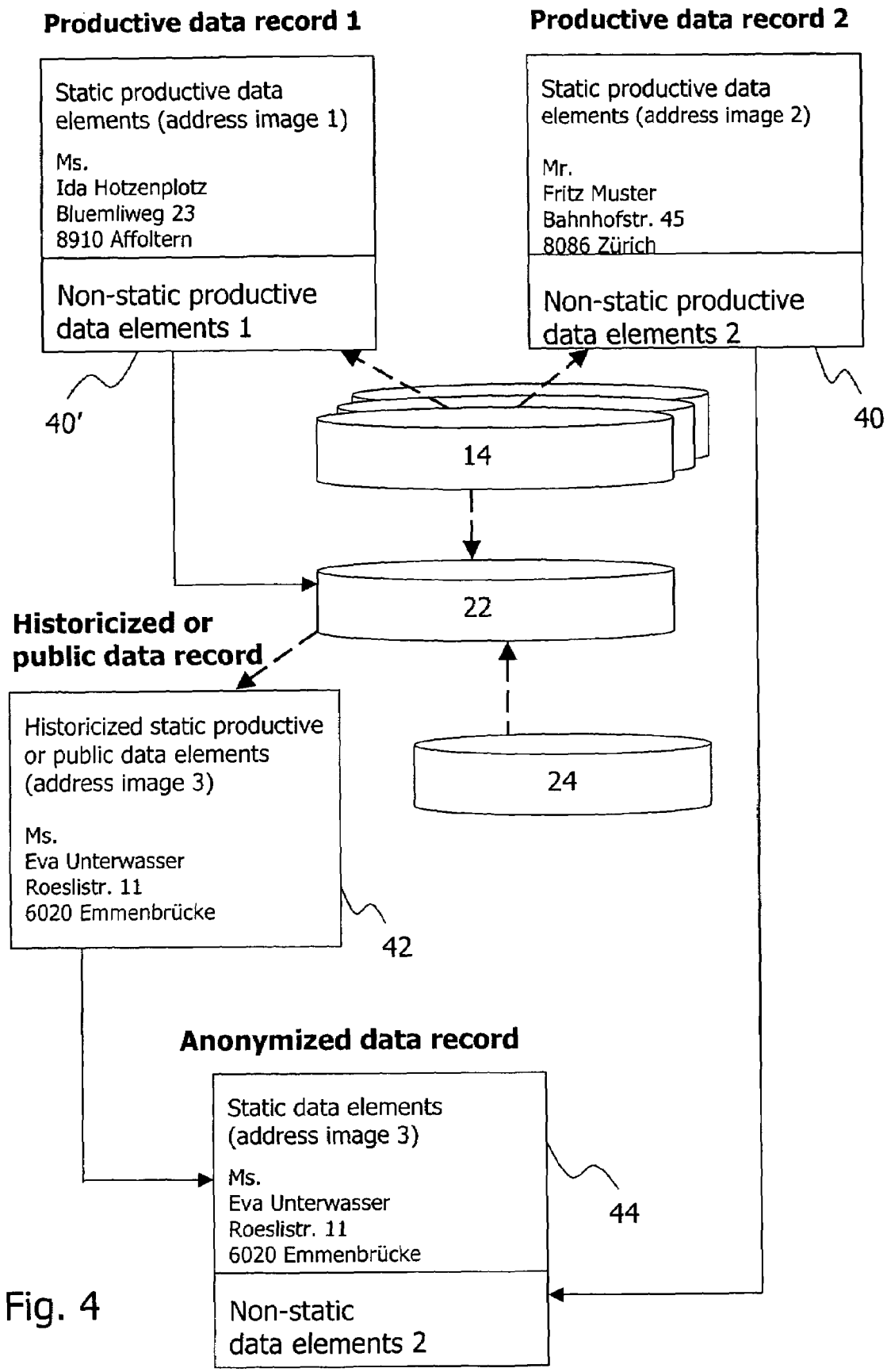
FIG. 4 shows a diagrammatic representation of the generation of anonymized data records in accordance with a second embodiment.

FIG. 4 shows in a diagrammatic representation a further exemplary embodiment for the generation of an anonymized data record by combining data elements of a productive data record with data elements of a non-productive data record.

The exemplary embodiment shown in FIG. 4 relates to the generation of anonymized data records for developing and testing of especially those application programs that output the data elements contained in the anonymized data records on a display device or in the form of printed matter. More strictly speaking, anonymized data records are to be made available that permit the development and testing of address-based application programs. Such application programs serve, for instance, to create an addressed statement of account containing non-static productive data (such as account balances, account turnovers, etc.) and static productive data (such as account numbers, name details and address details). In this connection, for example, it is necessary to ensure that all the relevant address details are shown inside a limited window of an envelope. For this reason there is the requirement that the anonymized address images are, in regard to their geometrical dimensions, a faithful imaging of the productive address images in order to be able to check, for example, the relative position between window and address imprint. Owing to the confidentiality of the non-static productive data (bank secret), however, the productive data records must not be used in creating test statements of account for development and test purposes. On the contrary, the object is to assign anonymized address images to the non-static productive data.

For this purpose, as shown in FIG. 4, a non-productive database 22 containing non-productive data records is created in a first step. This takes place in such a way that a user-selected selection of the address images (that is to say of the static data elements) contained in the productive databases 14 are transferred after the fashion of an instant photograph of the database content to the non-productive database 22. To improve the degree of anonymization, address images are furthermore loaded from the publicly accessible electronic database 24 (for example, from an electronic telephone book) into the non-productive database 22. Approximately 10% of the data records of the non-productive database 22 originate from the publicly accessible electronic database 24.

In accordance with a variant of the exemplary embodiment shown in FIG. 4, only the data elements name and first name are transferred from the productive databases 14 to the non-productive database 22. In the latter, these two data elements are combined with address details (for example, street, town, etc.) that may originate from the publicly accessible electronic database 24. In addition, complete address images (including first name and surname) may also be extracted from the publicly accessible electronic database 24 to generate non-productive data records. This measure is expedient, in particular, if yet further data elements are needed (in addition to the data elements read out of the productive databases 14) to ensure that no data record having an unambiguous character string length combination occurs in the non-productive database 22.

In accordance with the exemplary embodiment shown in FIG. 4, the non-productive data records do not correspond, in regard to the character-string length-statistics of the data elements first name and surname (assigned data element identifiers are used internally but are not shown in FIG. 4), to productive data records. This implies, for example, that, for the productive address image 1 of the productive data record 40' comprising a three-character first name (Ida) and a surname comprising eleven characters (Hotzenplotz), there is a corresponding non-productive data record 42 containing a non-productive address image that likewise provides a first name comprising three characters (Eva) and a surname comprising eleven characters (Unterwasser). For the anonymized data record 44 to be generated and for development and test purposes, it is irrelevant in this connection whether the data elements of the address image of the non-productive data record 42 originated from the publicly accessible electronic database 26 or, alternatively, from the productive database 14.

Furthermore, the statistical properties of the data records, data elements and of data element segments in the non-productive database 22 are approximated as far reachingly as possible to the statistical properties of the data records, data elements and of data element segments in the productive databases 14. This relates, for example, to the statistical distributions of the character string lengths and also to the statistical distributions of the initial letters at least of the surnames. This measure facilitates the development and testing of application programs that comprise sorting algorithms or similar selective mechanisms.

To generate the anonymized data record 44 shown in FIG. 4, one data record 40 is first determined (or derived) from each of the productive databases 14 and also a data record 42 is determined (or derived) from the non-productive database 22. The determination may take place on an assignment table or spontaneously and on a random basis. The non-productive data record 42 comprises (at least) one historicized productive or public address image that replaces, for the purpose of anonymizing the productive data record 40, its productive address image. The anonymized data record 44 to be generated then comprises, in addition to the address image of the data record 42 read out of the non-productive database 22, the non-static data elements of the productive data record 40. If necessary, individual non-static productive data elements of the productive data record 40 can likewise also be anonymized. The (non-productive) data necessary for this purpose can be extracted from the non-productive data record 42 or generated in another way.

As became evident from the above description, the invention permits, in a simple way, the generation of anonymized data records from productive data records. The anonymized data records are eminently suitable for trial runs of new application programs since they were approximated to the productive data records, in particular, in regard to character string lengths. This fact results in smaller start-up problems when new applications are used in the productive environment.

Although the invention was described on the basis of a plurality of individual embodiments that can be combined with one another, numerous changes and modifications are conceivable. The invention can therefore be practised even deviating from the above exposition within the scope of the claims below.

The invention claimed is:

1. A method for the computer aided-generation of anonymized data records for developing and testing application programs that are intended for use in a productive environment, comprising the steps of:
   providing at least one productive database containing data records that contain productive data elements to be anonymized;
   providing at least one non-productive database containing data records that, in regard to statistical distributions of character string lengths of data elements contained therein, correspond to the data records of the at least one productive database;
   determining a first data record from the productive database;
   determining a second data record from the non-productive database; and
   generating an anonymized data record by replacing productive data elements to be anonymized in the first data record by data of the second data record.

2. The method according to claim 1, wherein the replacement takes place in such a way that the productive data elements to be anonymized in the first data record have, at least with high probability, character string lengths other than the data elements of the second data record that replace the productive data elements to be anonymized in the first data record.

3. The method according to claim 1, wherein the non-productive database does not contain a data record that, in regard to a combination of character string lengths of a data element set contained therein, occurs only once in the non-productive database.

4. The method according to claim 1, wherein data elements contained in the non-productive database correspond, in regard to at least one of the number of characters contained therein and the geometrical dimensions thereof when reproduced, to data elements from the productive database.

5. The method according to claim 1, wherein data element images of the non-productive data records at least partly correspond to data element images of the productive data records.

6. The method according to claim 1, wherein the non-productive database contains at least one of copies of data records and copies of data elements of the productive database.

7. The method according to claim 1, wherein the non-productive database contains data records comprising data elements different from the productive data elements.

8. The method according to claim 7, wherein the proportion of non-productive data records comprising data elements different from the productive data elements is at least 5% of all records of the non-productive database.

9. The method according to claim 7, wherein the data elements different from the productive data elements in the non-productive database were extracted from a publicly accessible electronic database or file.

10. The method according to claim 1, wherein the determination of at least one of the first data record and the second data record is based on an assignment between data elements or data records from the non-productive database and data elements or data records to be anonymized from the productive database.

11. The method according to claim 10, wherein the assignment takes place deterministically.

12. The method according to claim 10, wherein the assignment takes place on a random basis.

13. The method according to claim 11, wherein the assignment is based on a cryptographic mechanism.

14. The method according to claim 11, wherein the deterministic assignment permits a subsequent determination of the data element or data record, assigned to an anonymized data element or data record, from the productive database.

15. The method according to claim 11, wherein the deterministic assignment ensures that the same data element or the same data record from the non-productive database is always assigned to a data element or data record from the productive database.

16. The method according to claim 1, wherein statistical properties of the data elements or of data element segments in the non-productive database correspond to or are approximate to statistical properties of the data elements or of data element segments in the productive database.

17. The method according to claim 1, wherein statistical distributions of at least the respective first alphanumerical character of data elements in the productive database and corresponding data elements in the non-productive database correspond at least approximately.

18. The method according to claim 1, wherein identifiers are assigned in each case to the individual data elements in the productive database and in the non-productive database and wherein the productive data elements to be anonymized are replaced by data elements having corresponding identifiers.

19. The method according to claim 1, wherein the data elements contained in the non-productive database have a meaning that can be comprehended by a user.

20. The method according to claim 1, wherein the data elements contained in at least one of the productive and the non-productive database contain at least one of name data and address data.

21. The method according to claim 1, wherein the anonymized data records are used for developing and testing application programs that output data elements contained in the anonymized data records on a display device or in the form of printed matter.

22. A computer program product comprising program code means for performing the method according to claim 1 when the computer program product is executed on one or more computers.

23. The computer program according to claim 22, stored on a computer-readable data medium.

24. A computer system for generating anonymized data records for developing and testing application programs that are intended for use in a productive environment, comprising:
   at least one productive database with data records that contain productive data elements to be anonymized;
   at least one non-productive database with data records that, in regard to statistical distributions of a character string length of data elements contained therein, correspond to the productive data elements;
   a programmed anonymization computer with access to the productive database and to the non-productive database for determining a first data record from the productive database and a second data record from the non-productive database and for generating an anonymized data record by replacing the productive data elements to be anonymized in the first data record by data elements of the second data record.

* * * * *